United States Patent
Aoki

(10) Patent No.: US 9,497,410 B2
(45) Date of Patent: Nov. 15, 2016

(54) IMAGING APPARATUS AND FOCUS CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/718,258

(22) Filed: May 21, 2015

(65) Prior Publication Data

US 2015/0256792 A1    Sep. 10, 2015

Related U.S. Application Data

(63) Continuation of application No. PCT/JP2013/078727, filed on Oct. 23, 2013.

(30) Foreign Application Priority Data

Nov. 22, 2012  (JP) .................. 2012-256351

(51) Int. Cl.
| | |
|---|---|
| H04N 5/235 | (2006.01) |
| H04N 7/01 | (2006.01) |
| G02B 7/36 | (2006.01) |
| G03B 13/36 | (2006.01) |
| H04N 5/232 | (2006.01) |
| H04N 5/372 | (2011.01) |

(Continued)

(52) U.S. Cl.
CPC ............ *H04N 7/0132* (2013.01); *G02B 7/36* (2013.01); *G03B 13/36* (2013.01); *H04N 5/2357* (2013.01); *H04N 5/23212* (2013.01); *H04N 5/372* (2013.01); *H04N 5/374* (2013.01); *G03B 2213/00* (2013.01); *H04N 5/2353* (2013.01); *H04N 9/045* (2013.01)

(58) Field of Classification Search
None
See application file for complete search history.

(56) References Cited

U.S. PATENT DOCUMENTS

| | | |
|---|---|---|
| 7,589,764 B2 | 9/2009 | Nakata et al. |
| 8,687,080 B2 | 4/2014 | Kawarada |
| 8,730,347 B2 | 5/2014 | Hirose |

(Continued)

FOREIGN PATENT DOCUMENTS

| | | |
|---|---|---|
| JP | 63-308484 A | 12/1988 |
| JP | 2002-207162 A | 7/2002 |

(Continued)

OTHER PUBLICATIONS

JP 2002-207162 translation.*

(Continued)

*Primary Examiner* — Twyler Haskins
*Assistant Examiner* — Angel L Garces-Rivera
(74) *Attorney, Agent, or Firm* — Birch, Stewart, Kolasch & Birch, LLP

(57) ABSTRACT

It is intended to provide an imaging apparatus and a focus control method that can prevent AF speed reduction even at the occurrence of a flicker. A system control unit 11 of a digital camera having a solid-state imaging device 5 that shoots a subject via an imaging lens 1 including a focus lens selectively performs one of a first focus control for controlling the focus lens so as to move it to a focus position by a phase difference AF method and a second focus control for controlling the focus lens so as to move it to a focus position by a contrast AF method. The system control unit 11 selects and performs the first focus control in a state that a flicker detection unit 12 has detected a flicker.

2 Claims, 9 Drawing Sheets

(51) Int. Cl.
  *H04N 5/374* (2011.01)
  *H04N 9/04* (2006.01)

(56)  References Cited

U.S. PATENT DOCUMENTS

2006/0055813 A1  3/2006  Nakata et al.
2010/0238343 A1  9/2010  Kawarada
2012/0026358 A1  2/2012  Hirose

FOREIGN PATENT DOCUMENTS

| JP | 2006-84556 A | 3/2006 |
| JP | 2007-306093 A | 11/2007 |
| JP | 2008-26805 A | 2/2008 |
| JP | 2010-217618 A | 9/2010 |
| JP | 2010-263568 A | 11/2010 |

OTHER PUBLICATIONS

JP 2010-263568 translation.*
Japanese Office Action, dated May 12, 2015, for Japanese Application No. 2014-548497, with a partial English translation.
International Search Report issued in PCT/JP2013/078727, mailed on Feb. 4, 2014.
PCT/ISA/237—Issued in PCT/JP2013/078727, mailed on Feb. 4, 2014.
Chinese Office Action issued Jul. 25, 2016 in corresponding Chinese Application No. 2013-80060857.6, with an English translation.

* cited by examiner

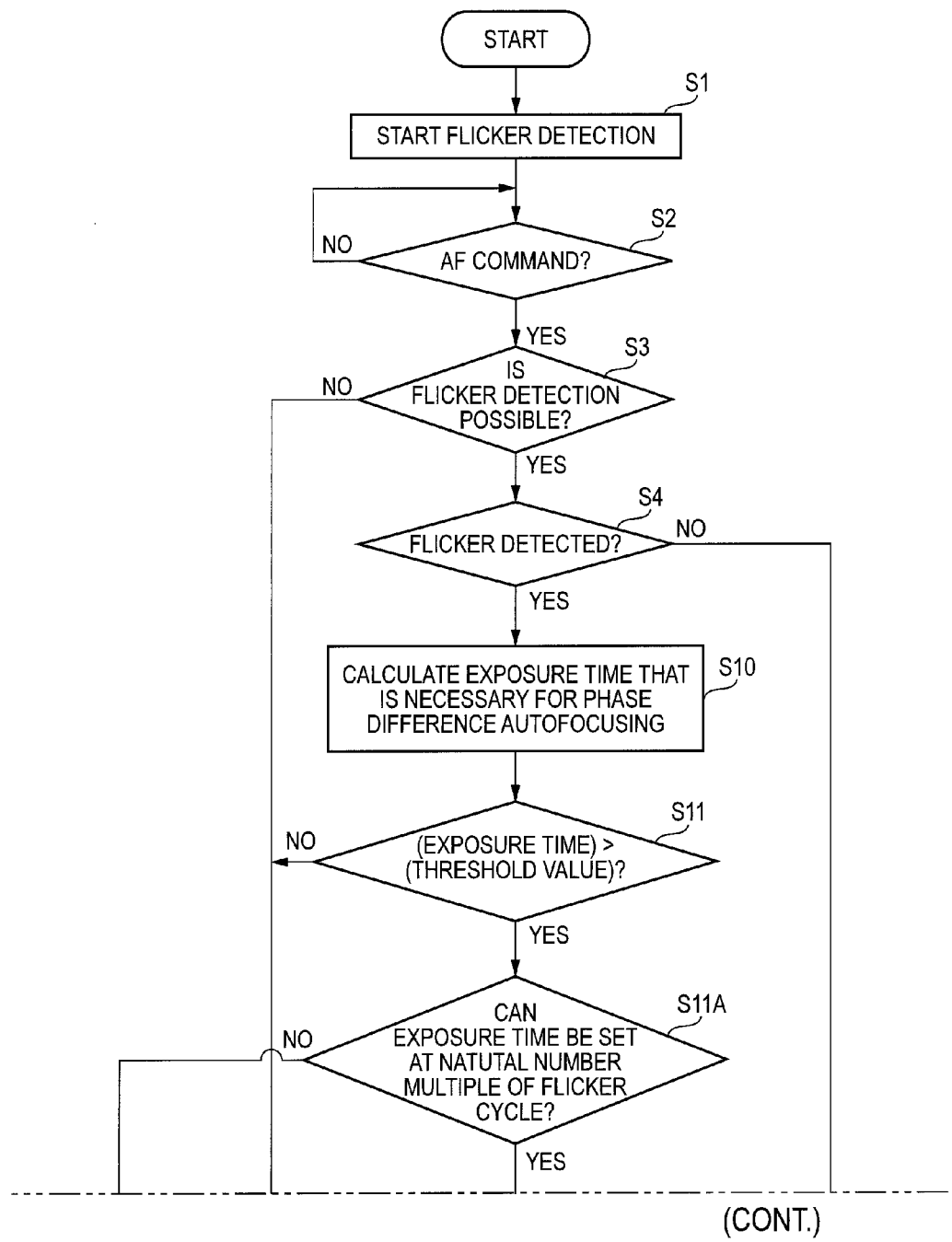

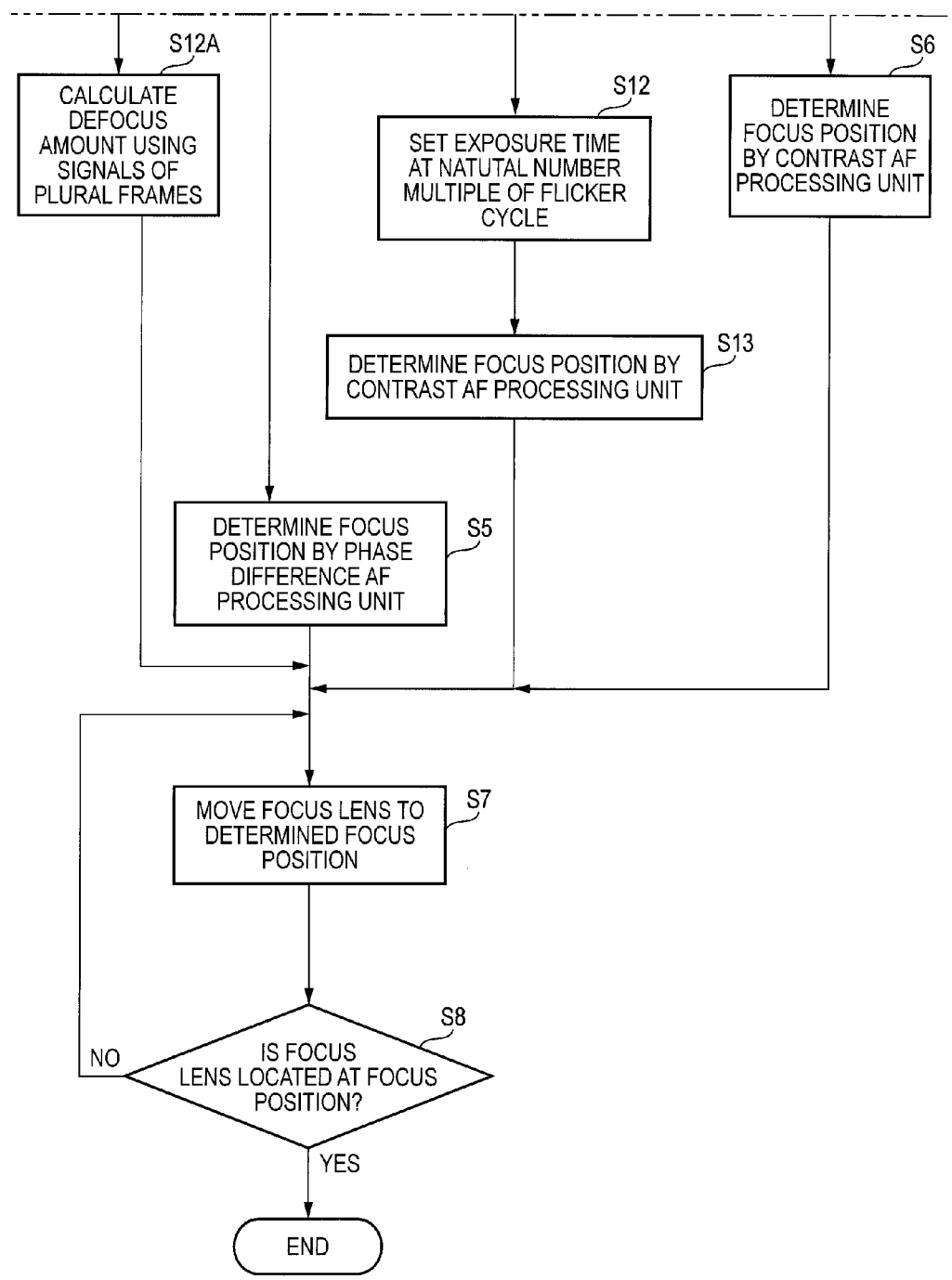

IMAGING APPARATUS AND FOCUS CONTROL METHOD

CROSS REFERENCE TO RELATED APPLICATION

This is a continuation of International Application No. PCT/JP2013/076727 filed on Oct. 23, 2013, and claims priority from Japanese Patent Application No. 2012-256351 filed on Nov. 22, 2012, the entire disclosures of which are incorporated herein by reference.

TECHNICAL FIELD

The present invention relates to an imaging apparatus and a focus control method.

BACKGROUND ART

In recent years, with the increase of the resolution of solid-state imaging devices such as CCD (charge-coupled device) image sensors and CMOS (complementary metal-oxide-semiconductor) image sensors, the demand for information apparatus having a shooting function, such as digital still cameras, digital video cameras, cell phones (e smartphones), and PDAs (personal digital assistants) has been increasing. Such information apparatus having a shooting function are referred to as imaging apparatus.

In such imaging apparatus, a contrast AF (autofocus) method and a phase difference AF method are employed as focus control methods for focusing the apparatus on a major subject. Since the contrast AF method and the phase difference AF method have respective advantages, imaging apparatus have been proposed which employ both methods (refer to Patent document 1, for example).

Under such light sources as fluorescent lamps, a light quantity variation occurs due to what is called flickering. If such a light quantity variation occurs in the contrast AF method, the peak portion of an evaluation value curve for evaluation of a focusing state may get out of shape depending on the timing of acquisition of an image, resulting in reduction in focusing accuracy.

In view of the above, in Patent document 1, in an imaging apparatus that increases the accuracy of phase difference autofocusing using both of phase difference autofocusing and contrast autofocusing, reduction of AF accuracy due to a flicker is prevented by changing an evaluation value calculation algorithm of contrast autofocusing when a flicker is detected.

Patent documents 2 and 3 disclose methods for suppressing a flicker by elongating the pixel exposure time in an imaging device when the flicker is detected.

PRIOR ART DOCUMENTS

Patent Documents

Patent document 1: JP-A-2007-306093
Patent document 2: JP-A-2010-217618
Patent document 3: JP-A-63-308484

SUMMARY OF THE INVENTION

Problems to be Solved by the Invention

As disclosed in Patent documents 2 and 3, a flicker can be suppressed by elongating the pixel exposure time. However, to calculate an evaluation value by what is called a hill-climbing method in the contrast AF method, it is necessary to calculate AF evaluation values at different lens positions; it is necessary to acquire a shot image signal at least three times. If the exposure time is elongated in each of three times of exposure, it may take long time to calculate an evaluation value, resulting in reduction in AF speed.

The present invention has been made in view of the above circumstances, and an object of the invention is therefore to provide an imaging apparatus and a focus control method that can prevent AF speed reduction even at the occurrence of a flicker.

Means for Solving the Problems

The invention provides an imaging apparatus having an imaging device that shoots a subject via an imaging optical system including a focus lens, comprising a focus control unit which selectively performs one of a first focus control for controlling the focus lens so as to move it to a focus position by a phase difference AF method and a second focus control for controlling the focus lens so as to move it to a focus position by a contrast AF method; and a flicker detection unit which detects a flicker, wherein the focus control unit decides which of the first focus control and the second focus control should be performed selectively at least according to whether the flicker detection unit has detected a flicker.

The invention also provides a focus control method in an imaging apparatus having an imaging device that shoots a subject via an imaging optical system including a focus lens, comprising a focus control step of selectively performing one of a first focus control for controlling the focus lens so as to move it to a focus position by a phase difference AF method and a second focus control for controlling the focus lens so as to move it to a focus position by a contrast AF method; and a flicker detecting step of detecting a flicker, wherein the focus control step decides which of the first focus control and the second focus control should be performed selectively at least according to whether the flicker detection unit has detected a flicker.

Advantages of the Invention

The invention can provide an imaging apparatus and a focus control method that can prevent AF speed reduction even at the occurrence of a flicker.

BRIEF DESCRIPTION OF THE DRAWINGS

FIG. 6 is a flowchart for description of a modified version of an operation of the digital camera shown in FIG. 1.

MODES FOR CARRYING OUT THE INVENTION

An embodiment of the present invention will be hereinafter described with reference to the drawings.

Figure 1:
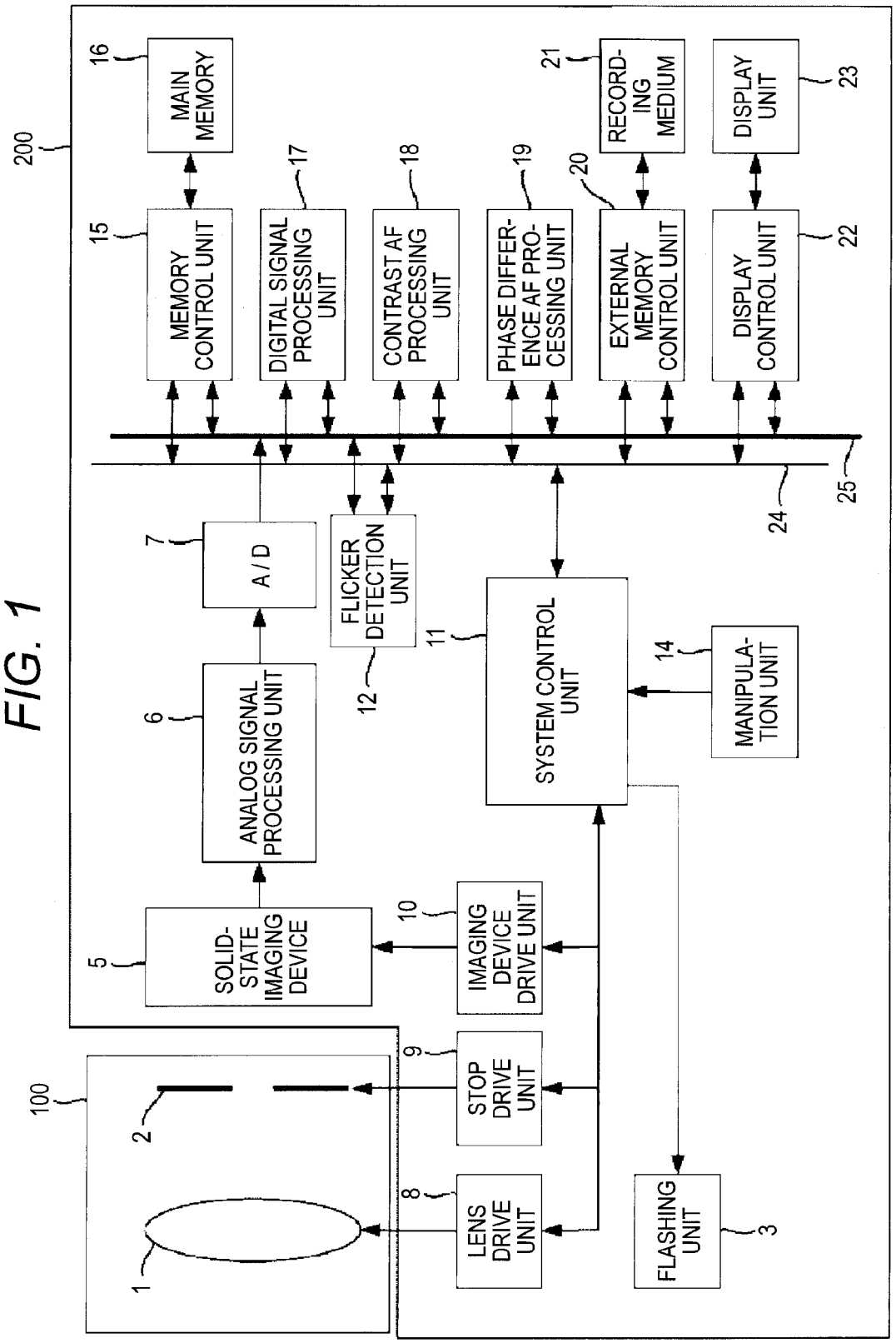
FIG. 1 shows a general configuration of a digital camera as an example imaging apparatus for description of an embodiment of the present invention.

FIG. 1 shows a general configuration of a digital camera as an example imaging apparatus for description of the embodiment of the invention.

The digital camera shown in FIG. 1 is equipped with a lens device 100 which serves as an imaging optical system and a camera body 200 in which the lens device 100 is installed. The lens device 100 may be either detachable from or fixed to the camera body 200.

The lens device 100 includes a shooting lens 1 which includes a focus lens, a zoom lens, etc. and a stop 2. It suffices that the shooting lens 1 include at least the focus lens.

The camera body 200 is equipped with a CCD, CMOS, or like solid-state imaging device 5 which shoots a subject via the lens device 100, an analog signal processing unit 6 which is connected to the output of the solid-state imaging device 5 and performs analog signal processing such as correlation double sampling processing, an A/D conversion circuit 7 which converts an analog signal that is output from the analog signal processing unit 6 into a digital signal, and a flashing unit 3 which emit auxiliary light for illuminating a subject using LEDs or the like. The flashing unit 3, the analog signal processing unit 6, and the A/D conversion circuit 7, are controlled by the system control unit 11. The analog signal processing unit 6 and the A/D conversion circuit 7 may be incorporated in the solid-state imaging device 5.

A system control unit 11 which supervises the overall electrical control system of the digital camera adjusts the positions of the focus lens and the zoom lens which are included in the shooting lens 1 by controlling a lens drive unit 8. Furthermore, the system control unit 11 adjusts the exposure amount by controlling the aperture of the stop 2 via a stop drive unit 9.

Furthermore, the system control unit 11 drives the solid-state imaging device 5 via an imaging device drive unit 10 and thereby causes the solid-state imaging device 5 to output, in the form of a shot image signal, a subject image taken through the shooting lens 1. An instruction signal from a user is input to the system control unit 11 through a manipulation unit 14.

As described later, the system control unit 11 selects one of a contrast AF processing unit 18 and a phase difference AF processing unit 19 and performs a focus control on the shooting lens 1 according to a focus position determined by the selected processing unit.

The electrical control system of the digital camera is further equipped with a flicker detection unit 12 which detects a flicker that occurs in a shooting period of the solid-state imaging device 5, a main memory 16, a memory control unit 15 which is connected to the main memory 16, a digital signal processing unit 17 which generates shot image data by performing interpolation calculation, gamma correction calculation, RGB/YC conversion processing, etc. on a shot image signal that is output from the A/D conversion circuit 7, the contrast AF processing unit 18 which determines a focus position by a contrast AF method, the phase difference AF processing unit 19 which determines a focus position by a phase difference AF method, an external memory control unit 20 to which a detachable recording medium 21 is connected, and a display control unit 22 to which a display unit 23 is connected which is installed on the camera back side, for example. The flicker detection unit 12, memory control unit 15, digital signal processing unit 17, contrast AF processing unit 18, phase difference AF processing unit 19, external memory control unit 20, and display control unit 22 are connected to each other by a control bus 24 and a data bus 25 and controlled according to instructions from the system control unit 11.

Figure 2:
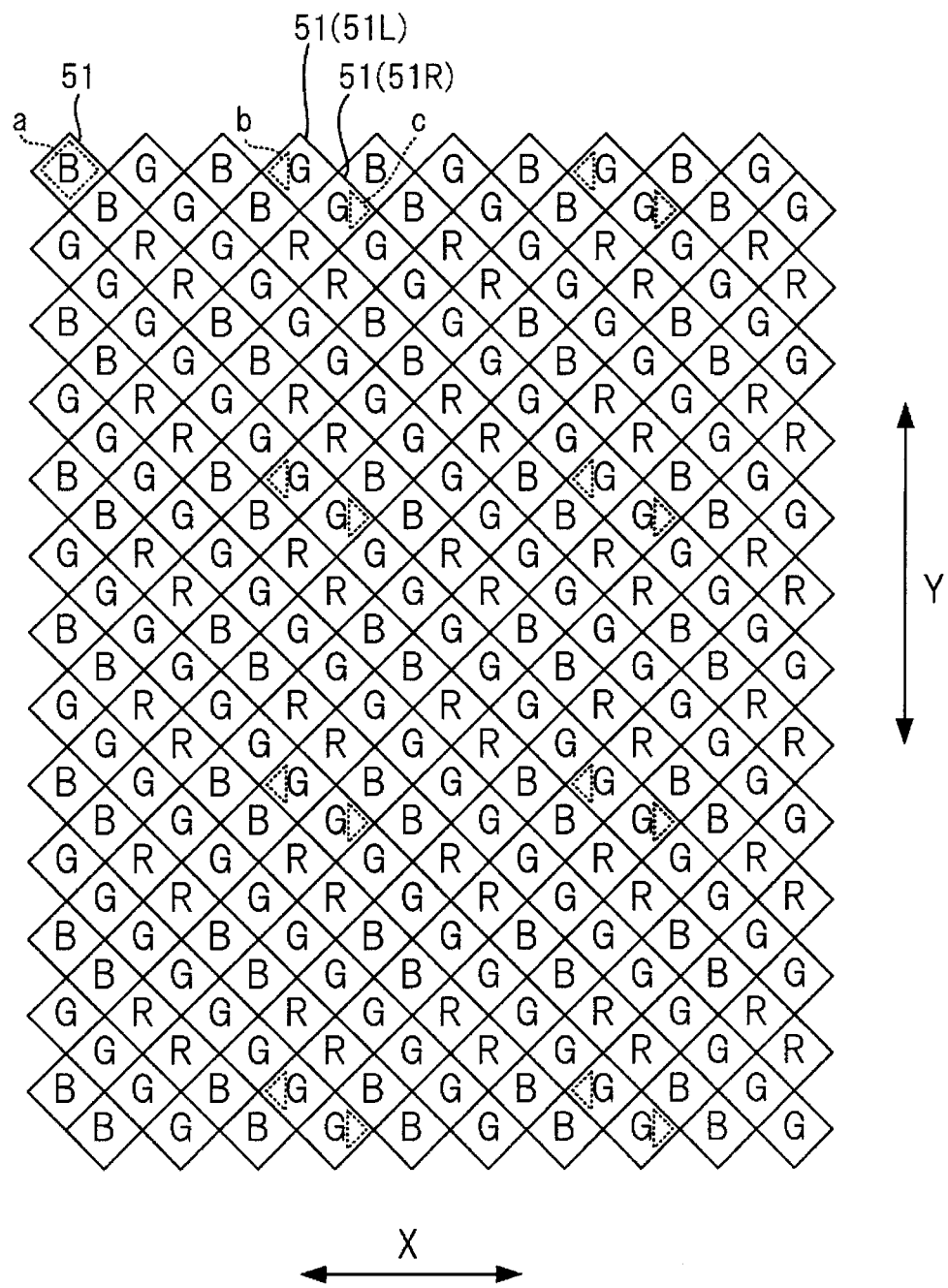
FIG. 2 is a schematic plan view showing the structure of a solid-state imaging device 5 installed in the digital camera shown in FIG. 1.

FIG. 2 is an enlarged view of part of the solid-state imaging device 5 installed in the digital camera shown in FIG. 1 and shows its planar configuration.

The solid-state imaging device 5 has a large number of pixels (square blocks in the figure) which are arranged on its photodetecting surface two-dimensionally, that is, in a row direction X and a column direction Y which is perpendicular to the row direction X. Not all of the pixels 51 are shown in FIG. 2; actually, about several millions to ten million and tens of thousands of pixels 51 are arranged two-dimensionally. When shooting is performed by the solid-state imaging device 5, output signals are output from the large number of pixels 51, respectively.

Each pixel 51 includes a photoelectric conversion portion such as a photodiode and a color filter that is formed over the photoelectric conversion portion.

In FIG. 2, each pixel 51 including a color filter that transmits red light (R filter) is given a character "R," each pixel 51 including a color filter that transmits green light (G filter) is given a character "G," and each pixel 51 including a color filter that transmits blue light (B filter) is given a character "B."

The large number of pixels 51 constitute an array in which plural pixel rows in each of which plural pixels 51 are arranged in the row direction X are arranged in the column direction Y. The odd-numbered pixel rows are deviated from the even-numbered pixel rows in the row direction X by approximately half of the arrangement pitch of the pixels 51 of each pixel row.

The color filters included in the pixels 51 of the odd-numbered pixel rows are Bayer-arranged as a whole, and the color filters included in the pixels 51 of the even-numbered pixel rows are also Bayer-arranged as a whole. Each pixel 51 of each odd-numbered pixel row and the pixel 51 that is adjacent to and is located on the bottom-right of it and serves to detect light of the same color as it constitute a pair. In this specification, the term "two pixels adjacent to each other" mean two such pixels that the line segment connecting their centers is shortest.

With the solid-state imaging device 5 having the above-described pixel arrangement, the sensitivity of the camera can be increased by adding output signals of each such pair of pixels 51 together. Furthermore, the dynamic range of the camera can be increased by changing the exposure times of each pair of pixels 51 and adding their output signals together.

In the solid-state imaging device 5, part of the pairs are made pairs for phase difference detection (hereinafter also referred to as "phase difference pairs"). In the example of FIG. 2, each phase difference pair consists of a phase difference detection pixel 51R and a phase difference detection pixel 51L that are adjacent to each other diagonally. The phase difference pair is not limited to pair pixels of the same color that are adjacent to each other and may be pair pixels of the same color that are spaced from each other by a distance of one, two, or several pixels, for example.

Each phase difference detection pixel 51R receives one of a pair of light beams that have passed through different portions of the pupil area of the shooting lens 1 (e.g., a light beam that has passed through the right half of the pupil area) and outputs a signal corresponding to a received light quantity. That is, each phase difference detection pixel 51R of the solid-state imaging device 5 serves to detect an image that is formed by one of a pair of light beams that have passed through different portions of the pupil area of the shooting lens 1.

Each phase difference detection pixel 51L receives the other of the above-mentioned pair of light beams (e.g., a light beam that has passed through the left half of the pupil area) and outputs a signal corresponding to a received light quantity. That is, each phase difference detection pixel 51L of the solid-state imaging device 5 serves to detect an image that is formed by the other of the pair of light beams that have passed through the different portions of the pupil area of the shooting lens 1.

The plural pixels 51 (hereinafter referred to as "imaging pixels") other than the phase difference detection pixels 51R and 51L each serve to detect an image that is formed by a light beam that has passed through almost all of the pupil area of the shooting lens 1. In the following description, among the imaging pixels 51, ones having an R filter will be referred to as R pixels 51, ones having an G filter will be referred to as G pixels 51, and ones having an B filter will be referred to as B pixels 51.

A light shield film is formed over the photoelectric conversion portions of the respective pixels 51, and openings that define photodetecting areas of the photoelectric conversion portions are formed through the light shield film.

The center of the opening (indicated by symbol a in FIG. 2) of each imaging pixel 51 coincides with the center of the photoelectric conversion portion of the imaging pixel 51 (the center of the square block). In FIG. 2, to simplify it, an opening a is shown for only one imaging pixel 51.

In contrast, the center of the opening (indicated by symbol c in FIG. 2) of each phase difference detection pixel 51R is deviated rightward from the center of the photoelectric conversion portion of the phase difference detection pixel 51R. The center of the opening (indicated by symbol b in FIG. 2) of each phase difference detection pixel 51L is deviated leftward from the center of the photoelectric conversion portion of the phase difference detection pixel 51L.

In the solid-state imaging device 5, part of the pixels 51 having a green color filter are made the phase difference detection pixels 51R and the phase difference detection pixels 51L.

The phase difference detection pixels 51R are arranged discretely and cyclically in the area where the pixels 51 are arranged. The phase difference detection pixels 51L are also arranged in the same manner.

In the example of FIG. 2, the phase difference detection pixels 51R are arranged every four pixels in the row direction X in part of the even-numbered pixel rows (in FIG. 2, four pixel rows arranged every four pixel rows). In the example of FIG. 2, the phase difference detection pixels 51L are arranged at the same cycle as the phase difference detection pixels 51R in the row direction X in part of the odd-numbered pixel rows (i.e., in the pixel rows adjacent to the respective pixel rows that include phase difference detection pixels 51R).

With the above structure, light that is received by each pixel 51L past the opening b of the light shield film is mainly light that passes through the left-hand part (as viewed from a subject) of the shooting lens 1 which is disposed over the paper surface of FIG. 2, that is, light that comes from such a direction that the subject is seen by the right eye. Light that is received by each pixel 51R past the opening c of the light shield film is mainly light that passes through the right-hand part (as viewed from the subject) of the shooting lens 1, that is, light that comes from such a direction that the subject is seen by the left eye.

That is, every phase difference detection pixel 51R can serve to produce a shot image signal in the same manner as the subject is seen by the left eye and every phase difference detection pixel 51L can serve to produce a shot image signal in the same manner as the subject is seen by the right eye. Therefore, phase difference information can be obtained by performing a correlation calculation on a combination of both signals.

Each pair of a phase difference detection pixel 51R and a phase difference detection pixel 51L produce phase difference information because their openings are deviated in the light shield film in the opposite directions. However, the structure for producing phase difference information is not limited to it and any of well-known structures may be employed. One example is a structure that each phase difference pair is provided with a common microlens (top lens).

Figure 3:
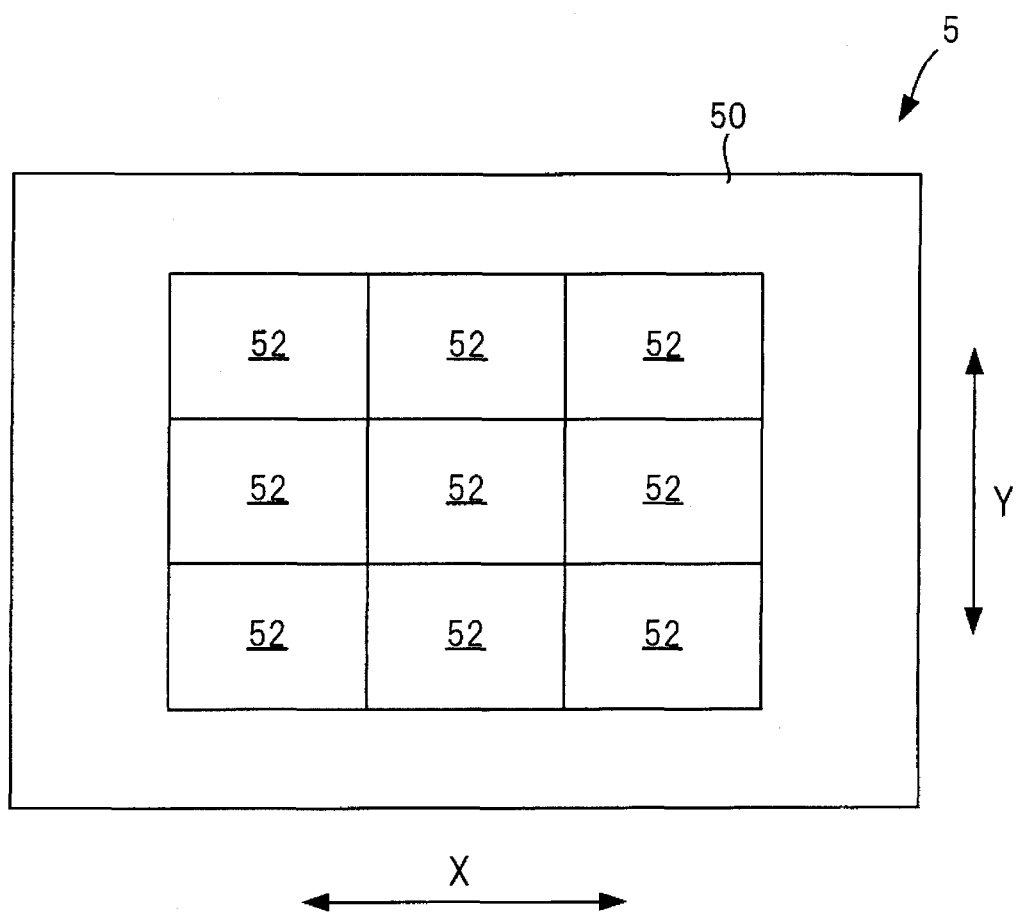
FIG. 3 is a schematic plan view showing the overall configuration of the solid-state imaging device 5 installed in the digital camera shown in FIG. 1.

FIG. 3 is a schematic plan view showing the overall configuration of the solid-state imaging device 5 installed in the digital camera shown in FIG. 1.

The solid-state imaging device 5 has a photodetecting surface 50 in which all of the pixels 51 are arranged. In the example of FIG. 2, the photodetecting surface 50 is provided with nine phase difference detection areas (hereinafter referred to as "AF areas") 52 for acquisition of phase difference information.

Each AF area 52 is an area that includes imaging pixels 51 having an R filter (R pixels 51), imaging pixels 51 having a G filter (G pixels 51), imaging pixels 51 having a B filter (B pixels 51), and plural phase difference pairs which are arranged in the row direction X.

Only imaging pixels 51 are disposed in the area, excluding the AF areas 52, on the photodetecting surface 50. The AF areas 52 may be disposed so as to occupy the entire photodetecting surface 50.

The phase difference AF processing unit 19 shown in FIG. 1 calculates a phase difference amount that is a relative positional deviation between two respective images formed by a pair of light beams (described above) using output signals that are read out of the phase difference detection pixels 51L and the phase difference detection pixels 51R existing in one, selected by a user manipulation or the like, of the nine AF areas 52. Based on the calculated phase difference amount, the phase difference AF processing unit 19 determines a focus adjusting state of the shooting lens 1 which is, in the embodiment, an amount of deviation from a focused state and its direction, that is, a defocus amount. Then the phase difference AF processing unit 19 determines a focus position of the focus lens on the basis of the defocus amount.

The contrast AF processing unit 18 shown in FIG. 1 analyzes an image taken by one AF area 52 selected from the nine AF areas 52 by a user manipulation or the like and thereby determines a focus position of the shooting lens 1 by a known contrast AF method.

More specifically, as the focus lens of the shooting lens 1 is moved (i.e., its position is varied) under the control of the system control unit 11, the contrast AF processing unit 18 calculates contrast (light-dark difference) of an image produced at each of movement positions. The contrast AF processing unit 18 determines, as a focus position, a position of the focus lens where maximum contrast is obtained.

The digital camera may be configured so that plural continuous AF areas 52 can be selected as well as one AF area 52.

The system control unit 11 shown in FIG. 1 selects the phase difference AF processing unit 19 in a state that a flicker is detected by the flicker detection unit 12 and selects the contrast AF processing unit 18 in a state that no flicker is detected by the flicker detection unit 12.

The flicker detection unit 12 detects presence/absence of a flicker on the basis of a variation between shot image signals taken by the solid-state imaging device 5. Therefore, a flicker cannot be detected until a certain number of shot image signals are stored from a start of shooting by the solid-state imaging device 5.

In a situation that whether a flicker is occurring or not is unknown, the probability of occurrence of an AF failure is lower when phase difference autofocusing is performed than when contrast autofocusing is performed. This is because in phase difference autofocusing a focus position can be determined by a single time of exposure.

In view of the above, the system control unit 11 selects the phase difference AF processing unit 19 in a period from a start of shooting for display of a live view image (which follows setting of a shooting mode) to establishment of a state that the flicker detection unit 12 can detect a flicker.

How the above-configured digital camera operates will be described below in a case that an AF control is performed continuously from reception of an AF command that is made by a manipulation of a shutter button provided in the manipulation unit 14 to reception of an AF termination command that is made in a similar manner (e.g., continuous autofocusing performed while a moving image is being taken).

Figure 4:
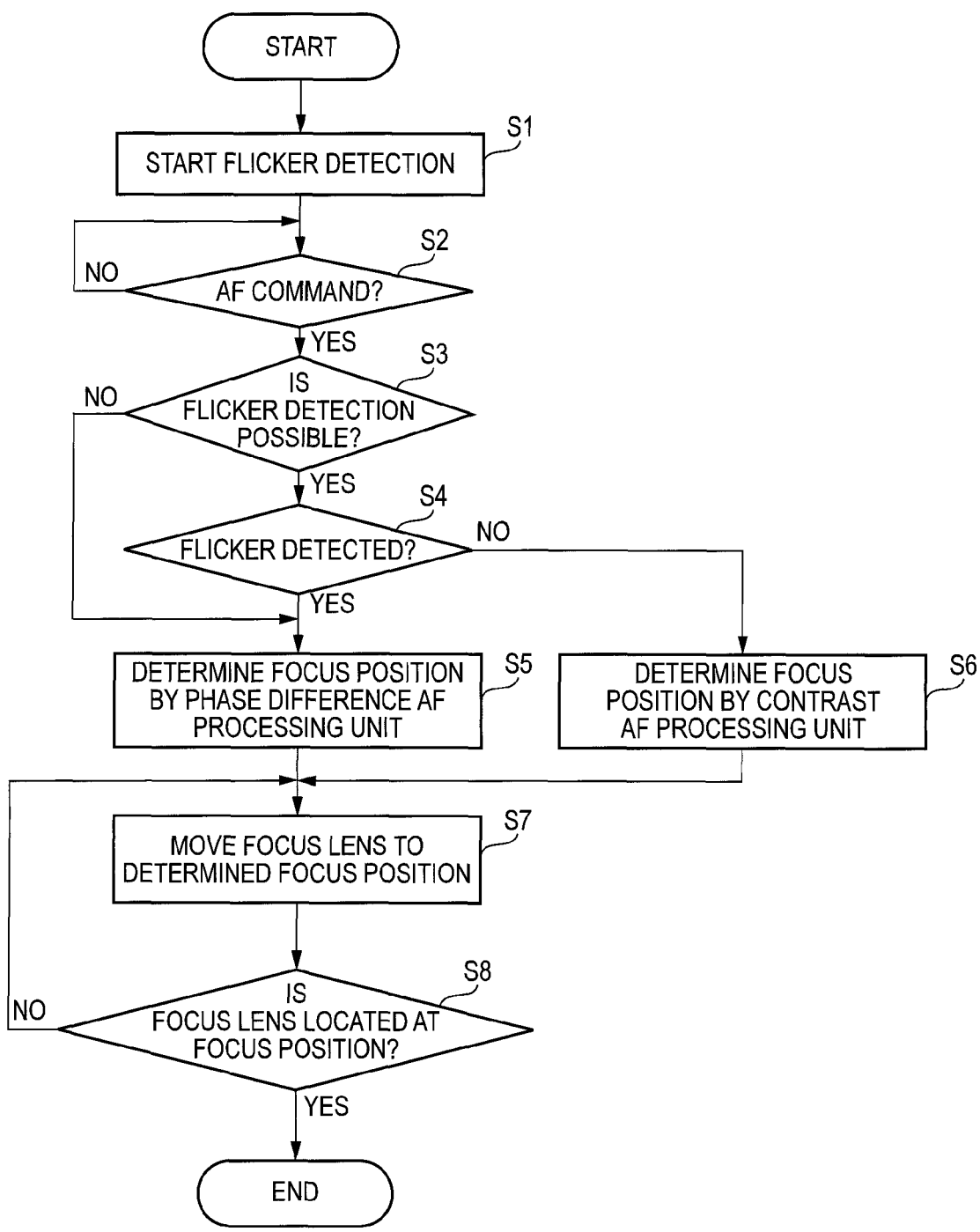
FIG. 4 is a flowchart for description of an operation of the digital camera shown in FIG. 1.

FIG. 4 is a flowchart for description of an operation of the digital camera shown in FIG. 1.

Upon a start of continuous shooting by the solid-state imaging device 5 (which follows setting of the shooting mode), the flicker detection unit 12 starts flicker detection processing using shot image signals that are output from the solid-state imaging device 5 (step S1).

If autofocusing is commanded (step S2: yes), the system control unit 11 judges whether a state that the flicker detection unit 12 can detect a flicker is established or not (step S3). An AF command is input to the system control unit 11 when the shutter button provided in the manipulation unit 14 is half depressed.

For example, the system control unit 11 judges that the current state is a flicker-detectable state if the number of shot image signals obtained by shooting by the solid-state imaging device 5 has reached a prescribed number, and judges that the current state is a flicker-undetectable state if the number of shot image signals obtained by shooting by the solid-state imaging device 5 is smaller than the prescribed number.

If the judgment result of step S3 is affirmative, the system control unit 11 judges whether or not a flicker has been detected by the flicker detection unit 12 (step S4). The system control unit 11 executes step S5 if a flicker has been detected (step S4: yes), and executes step S6 if a flicker has not been detected (step S4: no).

If the judgment result of step S3 is negative, the system control unit 11 executes step S5.

At step S5, the system control unit 11 causes the phase difference AF processing unit 19 to determine a focus position. At step S6, the system control unit 11 causes the contrast AF processing unit 18 to determine a focus position.

After the execution of step S5 or S6, the system control unit 11 moves the focus lens to the determined focus position (step S7). Subsequently, when the focus lens has been moved to the focus position (step S8: yes), the system control unit 11 finishes the AF processing.

As described above, in the digital camera shown in FIG. 1, a focus control is performed by the phase difference AF method in a state that a flicker is being detected. In a focus control by the contrast AF method, if a flick is occurring, it is necessary to elongate the exposure time to eliminate its influence and hence it takes long time to move the focus lens to a focus position. In view of this, as described above, if a flick is occurring, a focus control is performed by the phase difference AF method, as a result of which the focus lens can be moved to a focus position at high speed. The AF speed can thus be increased.

If a state that the flicker detection unit 12 can detect a flicker is not established, a focus control is performed by the phase difference AF method. As a result, reduction of AF accuracy can be prevented in, for example, a case that shooting is performed immediately after power-on of the digital camera.

Although at step S6 in FIG. 4 the system control unit 11 causes the contrast AF processing unit 18 to determine a focus position, the system control unit 11 may cause the phase difference AF processing unit 19 to determine a focus position.

Which of the contrast AF processing unit 18 and the phase difference AF processing unit 19 should be selected at step S6 may be decided according to a preset mode.

For example, the system control unit 11 may select the phase difference AF processing unit 19 at step S6 if a mode in which priority is given to sheeting speed is set in the digital camera by a manipulation on the manipulation unit 14, and select the contrast AF processing unit 18 at step S6 if a mode in which priority is given to image quality is set in the digital camera.

As a further alternative, if a manual setting to the effect that the contrast AF processing unit 18 should be used preferentially has been made by manipulating the manipulation unit 14, the system control unit 11 selects the contrast AF processing unit 18 at step S6 following that setting information. If a manual setting to the effect that the phase difference AF processing unit 19 should be used preferentially has been made by manipulating the manipulation unit 14, the system control unit 11 may select the phase difference AF processing unit 19 at step S6 following that setting information.

If a transition is made to step S5 as a result of the system control unit 11's judging at step S3 in FIG. 4 that a flicker is not detectable or as a result of the system control unit 11's judging at step S4 that a flicker is present, at step S5 the system control unit 11 may perform a control for causing the flashing unit 3 to emit auxiliary light during an exposure period of the phase difference detection pixels 51L and the phase difference detection pixels 51R existing in an AF area 52 selected in advance. This control for causing the flashing unit 3 to emit auxiliary light during an exposure period of the phase difference detection pixels can lower the influence of a flicker.

Output signals of imaging pixels 51 may be saturated by the emission of auxiliary light, lowering the image quality of a live view image produced by the exposure. In view of this, when auxiliary light is emitted at step S5, it is preferable that the system control unit 11 read signals only from the phase difference detection pixels 51R and phase difference detection pixels 51L (i.e., not read signals from the imaging pixels 51) and cause calculation of a defocus amount without generation of a live view image.

The digital camera shown in FIG. 1 employs the solid-state imaging device 5 which incorporates the phase difference detection pixels 51R and 51L together with the imaging pixels 51. As a result, the phase difference detection pixels 51R and 51L are lower in sensitivity than the imaging pixels 51.

Therefore, to perform a focus control with high accuracy by the phase difference AF method, it is necessary that output signals of the phase difference detection pixels 51R and 51L be higher than a certain level.

However, for certain kinds of subjects, there may occur a case that output signal levels of the phase difference detection pixels 51R and 51L are so low as not to assure sufficient phase difference AF accuracy. In such a case, if the situation does not allow a change of the F value, the system control unit 11 needs to elongate the exposure time of the phase difference detection pixels 51R and 51L to such an extent that sufficient phase difference AF accuracy can be maintained.

Figure 5:
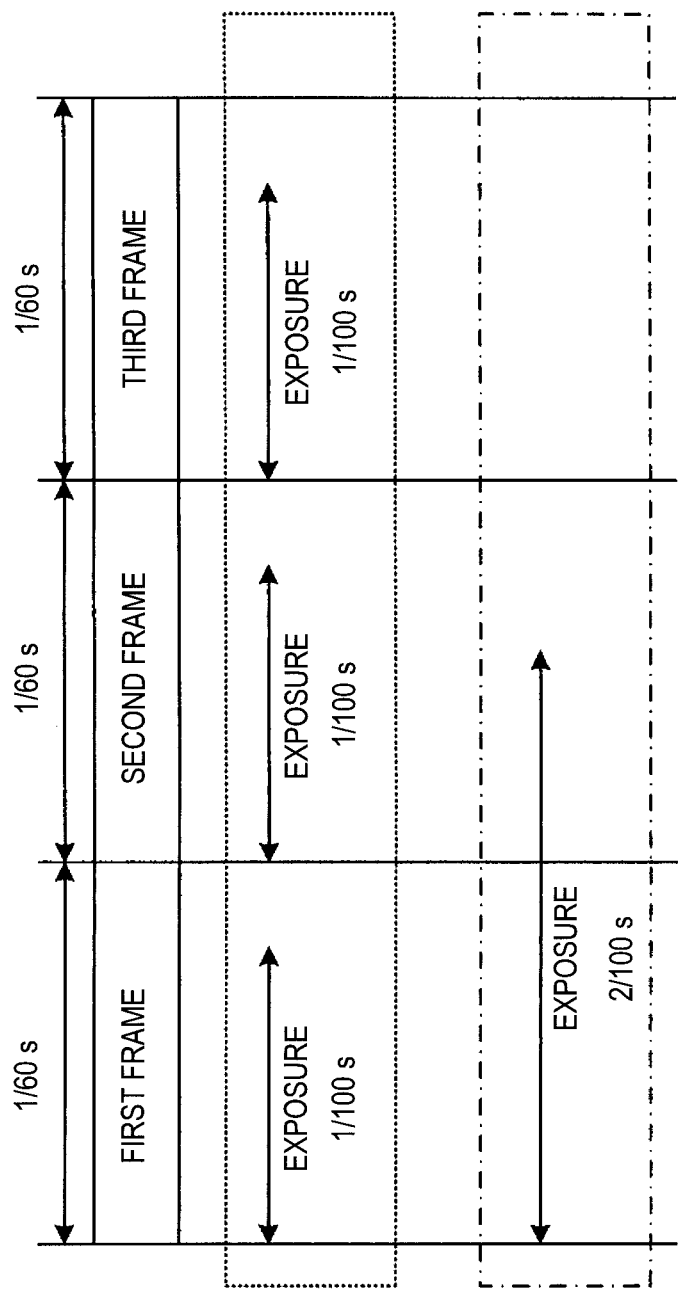
FIG. 5 shows an example in which an exposure time that is necessary for phase difference autofocusing exceeds a frame rate.

Assume an example case that as shown in FIG. 5 the imaging frame rate is 1/60 s and the exposure time of a focus control by the phase difference AF method is elongated to 2/100 s (enclosed by a chain line in FIG. 5).

To determine a focus position by the contrast AF method, it is necessary to perform plural times of shooting (in the example of FIG. 5, three times) while changing the position of the focus lens. To determine a focus position by the contrast AF method without being influenced by a flicker, it is necessary to set the exposure time of the solid-state imaging device 5 in each of the three imaging frames equal to an natural number multiple of a flicker cycle.

In the portion enclosed by a broken line in FIG. 5, the exposure time of each of three times of shooting that are necessary to determine a focus position correctly by the contrast AF method in a state that a flicker of fluorescent lamps being turned on and off at 100 Hz is detected is set at 1/100 s.

As shown in FIG. 5, also in performing a focus control by the phase difference AF method, there may occur a case that the exposure time of the solid-state imaging device 5 is made longer than the frame rate (1/60 s). In such a case, there is no other way than to set the frame rate lower than 1/60 s.

On the other hand, in the contrast AF method, since output signals of the imaging pixels 51 which have high sensitivities are used, highly accurate autofocusing can be performed merely by setting the exposure time of each frame at 1/100 s (enclosed by the broken line in FIG. 5). Thus, the contrast AF method does not require a frame rate change.

That is, in a scene in which a subject is so dark that the exposure time of the solid-state imaging device 5 that is necessary to perform a focus control by the phase difference AF method exceeds the cycle corresponding to a preset frame rate, employment of the contrast AF method which does not require a frame rate change is preferable in terms of prevention of large variations in image quality.

Such a preferable operation of the digital camera will be described below with reference to FIG. 6.

FIG. 6 is a flowchart illustrating a modified operation of the digital camera shown in FIG. 1. Steps in FIG. 6 having the same ones in the operation of FIG. 4 are given the same reference symbols as the latter, and descriptions therefor will be omitted.

If the judgment result of step S4 is affirmative, the system control unit 11 calculates an average of output signals that are output from the phase difference detection pixels 51R or 51L existing in an AF area 52 selected in advance and calculates, on the basis of the calculated average, an exposure time of the solid-state imaging device 5 that is necessary to determine a focus position by the phase difference AF method (step S10).

Then the system control unit 11 compares the exposure time calculated at step S10 with a threshold value (step S11). The threshold value is set at a one-frame period that is determined by a frame rate.

If judging at step S11 that the exposure time is longer than the threshold value, then the system control unit 11 judges whether or not the exposure time of the solid-state imaging device 5 can be set at a natural number multiple (e.g., 1/100 s), not larger than the threshold value, of the cycle of the flicker detected at step S4 (step S11A).

If judging that the exposure time of the solid-state imaging device 5 can be set at a natural number multiple of the flicker cycle (step S11A: yes), the system control unit 11 sets the exposure time of the solid-state imaging device 5 at a natural number multiple of the flicker cycle (step S12). At step S12, the exposure time is set at a time that does not exceed the threshold value.

Subsequently, the system control unit 11 causes the solid-state imaging device 5 to perform at least three times of shooting in the thus-set exposure time while moving the focus lens and causes the contrast AF processing unit 18 to determine a focus position using shot image signals produced by these shooting operations (step S13). Step S7 is executed after the execution of step S13.

If judging that the exposure time of the solid-state imaging device 5 cannot be set at a natural number multiple of the flicker cycle (step S11A: no), the system control unit 11 causes the phase difference AF processing unit 19 to execute step S12A and then execute step S7.

At step S12A, the phase difference AF processing unit 19 averages, on a pixel-by-pixel basis, output signals of plural frames that are output from the phase difference detection pixels 51R and the phase difference detection pixels 51L existing in the AF area 52 selected in advance and calculates a defocus amount by a correlation calculation using resulting average signals.

Alternatively, at step S12A, the phase difference AF processing unit 19 calculates, on a frame-by-frame basis, defocus amounts using output signals of plural frames that are output from the phase difference detection pixels 51R and the phase difference detection pixels 51L existing in the AF area 52 selected in advance and averages the defocus amounts calculated for the respective frames to obtain a final defocus amount.

If judging at step S11 that the exposure time is shorter than the threshold value, the system control unit 11 executes step S5.

As described above, in the modification shown in FIG. 6, a focus control is performed by the contrast AF method even in a state that a flicker is detected as long as an exposure time of the solid-state imaging device 5 is longer than the threshold value and can be set at a natural number multiple of a flicker cycle. This can prevent a frame rate change during shooting and thereby stabilize the shooting quality. Furthermore, phase difference autofocusing is performed for a bright subject even if a flicker is occurring, in which case the AF speed can be increased.

In the modification shown in FIG. 6, a defocus amount is calculated using signals of plural frames if the judgment result of step S11A is negative, whereby the influence of a flicker can be reduced and reduction of the AF accuracy can be prevented.

Where a CMOS sensor is used as the solid-state imaging device 5, signals are read out of the respective pixels 51 by a rolling shutter method. Therefore, if the frame rate is lowered in a state that a flicker is occurring, the flicker may affect the image quality to a larger extent.

In view of this, in the operation of FIG. 6, the judgment of step S11 is made only if step S4 produces an affirmative judgment. As a result, if no flicker is occurring, an AF method intended by a user can be selected at step S6. As a result, image quality reduction at the occurrence of a flicker can be prevented while the camera usability is kept high.

Although the above description is directed to the case that the pixels 51 are arranged in what is called honeycomb form, the invention can employ a solid-state imaging device in which the pixels 51 are arranged in square lattice form.

Although the above description is directed to the case that the solid-state imaging device 5 incorporates color filters of plural colors and takes a color image, the solid-state imaging device 5 may be one for taking a monochrome image that incorporates monochrome (green) color filters or no color filters.

The above description is directed to the case that the solid-state imaging device 5 is an imaging device for both of shooting and phase difference detection in which the imaging pixels 51 and the phase difference detection pixels 51R and 51L are arranged in mixture. However, a configuration is possible that a device that has no imaging pixels 51 and is dedicated to phase difference autofocusing is installed in camera body 200 separately from the solid-state imaging device 5 and the phase difference AF processing unit 19 determines a focus position using output signals of this device.

The above description of the specification is directed to the digital camera which is an example imaging apparatus. A smartphone incorporating a camera according to another embodiment which is another example imaging apparatus will be described below.

Figure 7:
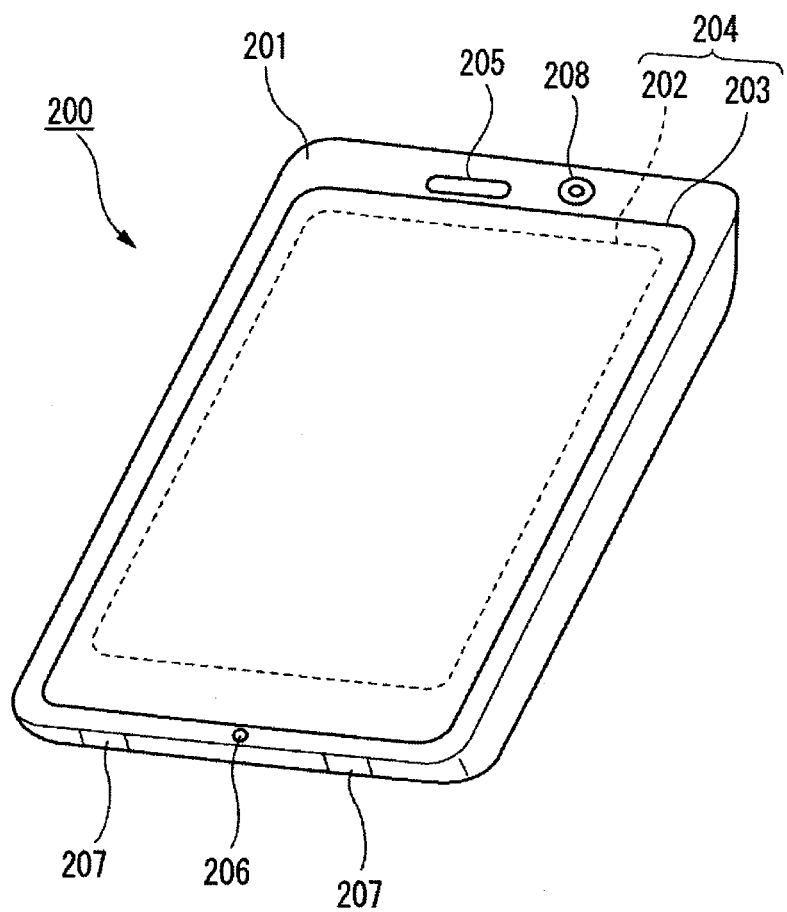
FIG. 7 illustrates a smartphone as an imaging apparatus.

FIG. 7 shows an appearance of the smartphone 200 according to another embodiment of the invention which is an example imaging apparatus. The smartphone 200 shown in FIG. 7 has a flat-plate-like body 201 and one surface of the body 201 is provided with a display/input unit 204 which is an integrated unit of a display panel 202 as a display unit and a manipulation panel 203 as an input unit. The body 201 is equipped with a speaker 205, a microphone 206, manipulation members 207, and a camera unit 208. The configuration of the body 201 is not limited to the above; for example, a configuration in which the display unit and the input unit are separated from each other and a configuration having a folding structure or a slide mechanism may be employed.

Figure 8:
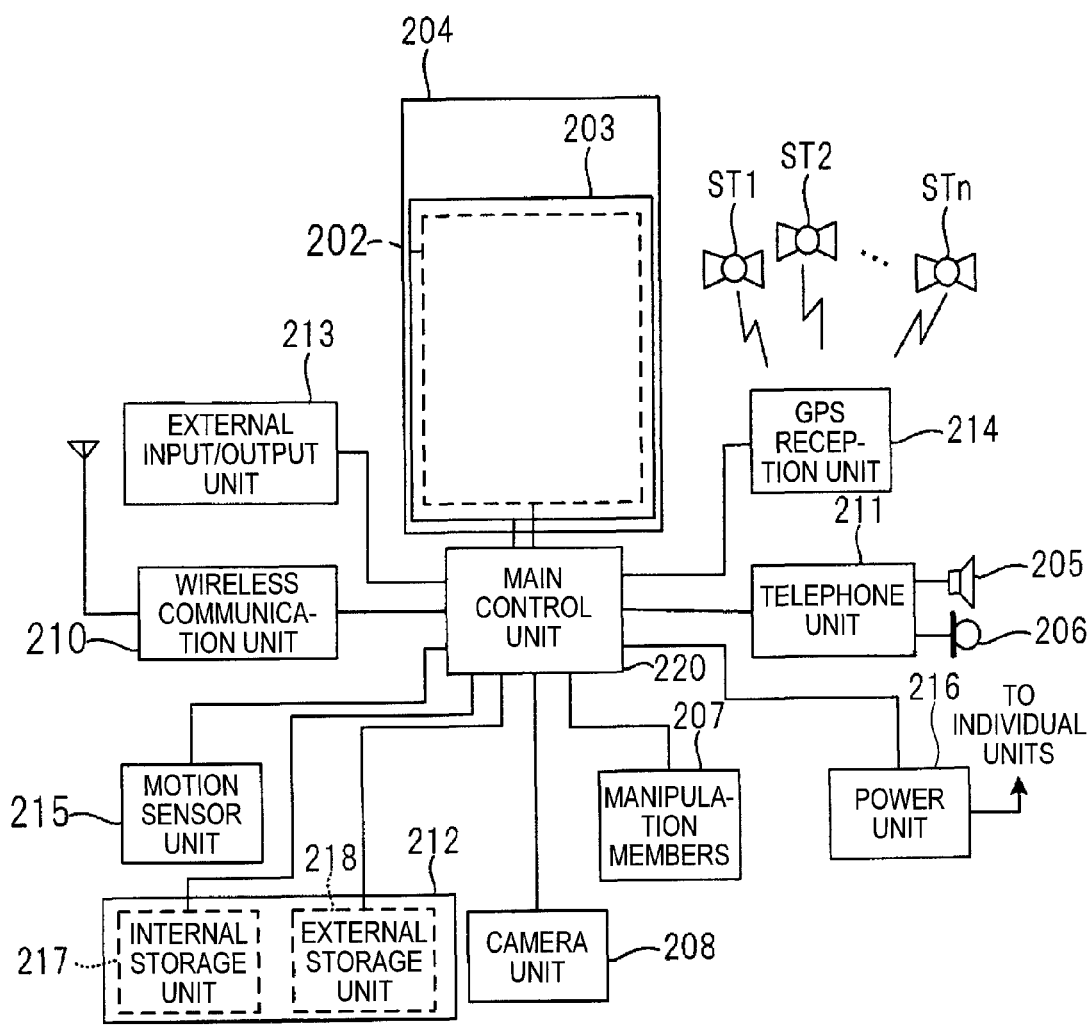
FIG. 8 is a block diagram showing the internal configuration of the smartphone shown in FIG. 7.

FIG. 8 is a block diagram showing the configuration of the smartphone 200 shown in FIG. 7. As shown in FIG. 7, the smartphone 200 is equipped with, as main constituent elements, a wireless communication unit 210, the display/input unit 204, a telephone unit 211, the manipulation members 207, the camera unit 208, a storage unit 212, an external input/output unit 213, a GPS (global positioning system) reception unit 214, a motion sensor unit 215, a power unit 216, and a main control unit 220. The smartphone 200 is also provided with, as a main function, a wireless communication function for performing a mobile wireless communication via abase station BS (not shown) and a mobile communication network NW (not shown).

The wireless communication unit 210 serves to perform a wireless communication with a base station BS of the mobile communication network NW under the control of the main control unit 220. By performing such wireless communications, the wireless communication unit 210 sends and receives various file data such as audio data and image data, e-mail data, etc. and receives web data, streaming data, etc.

The display/input unit 204 is what is called a touch panel that, under the control of the main control unit 220, displays an image (still image and moving image), text information, etc. and thereby gives information to a user visually as well as detects a user manipulation on displayed information. The display/input unit 204 is equipped with the display panel 202 and the manipulation panel 203.

The display panel 202 uses, as a display device, an LCD (liquid crystal display), an OELD (organic electroluminescence display), or the like.

The manipulation panel 203 is a device that is placed so as to enable visual recognition of an image displayed on the display screen of the display panel 202 and detects one or plural sets of coordinates of a manipulation by a user finger or a stylus. When manipulated by a user finger or a stylus, this device outputs, to the main control unit 220, a detection signal that is generated as a result of the manipulation. Then the main control unit 220 detects a manipulation position (coordinates) on the display panel 202 on the basis of the received detection signal.

As shown in FIG. 7, in the smartphone 200 according to the embodiment of the invention which is an example imaging apparatus, the display/input unit 204 is configured as the integrated unit of the display panel 202 and the manipulation panel 203 and the manipulation panel 203 is disposed in such a manner as to cover the display panel 202 completely.

Where this arrangement is employed, the manipulation panel 203 may have a function of detecting a user manipulation that is made even outside the area of the display panel 202. In other words, the manipulation panel 203 may be provided with a detection area (hereinafter referred to as a "display area") corresponding to its portion that coextends with the display panel 202 and a detection area (hereinafter referred to as a "non-display area") corresponding to its peripheral portion that does not coextend with the display panel 202.

The size of the display area may be completely the same as that of the display panel 202 (they need not always be the same). The manipulation panel 203 may be provided with two sensing areas, that is, a peripheral portion and an inside portion that is a portion other than the peripheral portion. Furthermore, the width of the peripheral portion is designed as appropriate so as to be suitable for the size of the body 201 and other factors. Still further, the position detection method of the manipulation panel 203 may be any of various methods such as a matrix switch method, a resistive film method, a surface acoustic wave method, an infrared method, an electromagnetic induction method, and a capacitance method.

Provided with the speaker 205 and the microphone 206, the telephone unit 211 serves to convert a user voice that is input through the microphone 206 into audio data that can be processed by the main control unit 220 and output the latter to the main control unit 220 and also serves to decode audio data that is received by the wireless communication unit 210 or the external input/output unit 213 and output decoded data from the speaker 205. For another example, the speaker 205 and the microphone 206 may be installed in the same surface as the display/input unit 204 is and a side surface of the body 201, respectively, as shown in FIG. 7.

The manipulation members 207 are hardware keys using key switches or the like and serve to receive user instructions. For example, as shown in FIG. 7, the manipulation members 207 are push-button switches that are installed in a side surface of the body 201 of the smartphone 200 and that are turned on when pushed down by a finger or the like and turned off due to the recovery force of a spring or the like when the finger is released.

The storage unit 212 serves to store control programs and control data of the main control unit 220, application software, address data in which a name, a telephone number, etc. of each party to communicate with are correlated with each other, data of e-mails that have been sent out or received, web data that have been downloaded by web browsing, and downloaded content data, and also serves to store streaming data etc. temporarily. The storage unit 212 consists of an internal storage unit 217 which is incorporated in the smartphone 200 and an external storage unit 218 having an external memory slot which is detachable. Each of the internal storage unit 217 and the external storage unit 218 which constitute the storage unit 212 is implemented using a storage medium of any of such types as a flash memory, a hard disk drive, Multimedia Card micro, a card-type memory (e.g., microSD (registered trademark) memory), a RAM (random access memory), and a ROM (read-only memory).

The external input/output unit 213 plays a role of interfacing with every external device connected to the smartphone 200, and serves to connect to an external device directly or indirectly by a communication or the like (e.g., universal serial bus (USB) or IEEE 1394) or a network (e.g., Internet, wireless LAN, Bluetooth (registered trademark), RFID (Radio Frequency Identification), Infrared Data Association (IrDA; registered trademark), UWB (ultra-wideband; registered trademark), or ZigBee (registered trademark)).

Example external devices to be connected to the smartphone 200 are a wired/wireless headset, a wired/wireless external charger, a wired/wireless data port, a memory card, a SIM (Subscriber Identity Module) card, and a UIM (User Identity Module) card which are connected via a card socket, an external audio/video device which is connected via an audio/video I/O (input/output) terminal, an external audio/video device which is connected wirelessly, a smartphone which is connected by wire or wirelessly, a personal computer which is connected by wire or wirelessly, a PDA which is connected by wire or wirelessly, a personal computer which is connected by wire or wirelessly, and an earphone. The external input/output unit 213 can give data transmitted from such an external device to internal constituent elements of the smartphone 200 and allows internal data of the smartphone 200 to be transmitted to such an external device.

According to instructions from the main control unit 220, the GPS reception unit 214 receives plural GPS signals transmitted from GPS satellites ST1-STn, performs positioning calculation processing on the basis of the received GPS signals, and detects a position (i.e., latitude, longitude, and height) of the smartphone 200. If position information can be acquired from the wireless communication unit 210 or the external input/output unit 213 (e.g., wireless LAN), the GPS reception unit 214 can also detect a position using that position information.

Equipped with, for example, a 3-axis acceleration sensor, the motion sensor unit 215 detects physical motion of the smartphone 200 according to instructions from the main control unit 220, as a result of which a movement direction and acceleration of the smartphone 200 can be detected. Detection results are output to the main control unit 220.

The power unit 216 supplies power stored in a battery (not shown) to the individual units of the smartphone 200 according to instructions from the main control unit 220.

Equipped with a microprocessor, the main control unit 220 operates according to control programs and control data stored in the storage unit 212 and supervises the individual units of the smartphone 200. To perform a voice communication or a data communication via the wireless communication unit 210, the main control unit 220 has a mobile communication control function for controlling the individual units for communication and application processing functions.

The application processing functions are realized in such a manner that the main control unit 220 operates according to application software that is stored in the storage unit 212. For example, the application processing functions are an infrared communication function of performing a data communication with a confronting device by controlling the external input/output unit 213, an e-mail function of sending and receiving an e-mail, and a web browsing function of browsing a web page.

The main control unit 220 has an image processing function for, for example, displaying video on the display/input unit 204 on the basis of image data (still image data or moving image data) such as reception data or downloaded streaming data. The image processing function means a function that the main control unit 220 decodes image data as mentioned above, performs image processing on a decoding result, and displays a resulting image on the display/input unit 204.

Furthermore, the main control unit 220 performs a display control on the display panel 202 and a manipulation detection control for detecting a user manipulation that is made using the manipulation members 207 or the manipulation panel 203. By performing a display control, the main control unit 220 displays icons for activation of application software, software keys such as scroll bars, and a window for writing an e-mail. The scroll bars are software keys for receiving an instruction for moving a display portion of, for example, a large image that cannot be displayed fully in the display area of the display panel 202.

By performing a manipulation detection control, the main control unit 220 detects a user manipulation that is made using the manipulation members 207, receives a manipulation on an icon as mentioned above or input of a character string to an input box of a window as mentioned above, or receives a display image scroll request that is made through a scroll bar.

The main control unit 220 also has a touch panel control function that the main control unit 220 judges whether a position of a manipulation on the manipulation panel 203 is in the coextending portion (display area) that coextends with the display panel 202 or the other portion, that is, the peripheral portion (non-display area) that does not coextend with the display panel 202 by performing a manipulation detection control and controls the sensing areas of the manipulation panel 203 and the display positions of software keys.

The main control unit 220 can also detect a gesture manipulation on the manipulation panel 203 and performs a preset function according to the detected gesture manipulation. The gesture manipulation is not a conventional simple touch manipulation but a manipulation of drawing a locus with a finger or the like, specifying plural positions simultaneously, or drawing loci from plural position to at least one position by combining such manipulations.

The camera unit 208 includes those units of the digital camera shown in FIG. 1 which exclude the external memory control unit 20, the recording medium 21, the display control unit 22, the display unit 23, and the manipulation unit 14. Shot image data generated by the camera unit 208 can be recorded in the storage unit 212 or output via the input/output unit 213 or the wireless communication unit 210. Although in the smartphone 200 shown in FIG. 7 the camera unit 208 is installed in the same surface as the display/input unit 204 is, the installation position of the camera unit 208 is not limited to that position; the camera unit 208 may be installed on the back side of the display/input unit 204.

The camera unit 208 can be used for various functions of the smartphone 200. For example, an image acquired by the camera unit 208 can be displayed on the display panel 202 or used as one manipulation input made through the manipulation panel 203. The GPS reception unit 214 can detect a position by referring to an image that is supplied from the camera unit 208. Furthermore, an optical axis direction of the camera unit 208 of the smartphone 200 can be judged or its current use environment can be judged by referring to an image supplied from the camera unit 208 using or without using the 3-axis acceleration sensor. Naturally, an image supplied from the camera unit 208 can be used in application software.

In addition, an operation is possible that image data of a still image or a moving image is added with position information acquired by the GPS reception unit 214, audio information acquired by the microphone 206 (may be converted into text information by the main control unit or the like through audio-to-text conversion), posture information acquire by the motion sensor unit 215, or another kind of information and is then recorded in the recording unit 212 or output via the input/output unit 213 or the wireless communication unit 210.

Also in the smartphone 200 having the above configuration, high imaging quality can be realized in such a manner that the solid-state imaging device 5 is used as an imaging device of the camera unit 208 and the main control unit 220 performs the operation shown in FIG. 4 or 6.

As described above, the following items are disclosed in this specification:

The disclosed imaging apparatus is an imaging apparatus having an imaging device that shoots a subject via an imaging optical system including a focus lens, comprising a focus control unit which selectively performs one of a first focus control for controlling the focus lens so as to move it to a focus position by a phase difference AF method and a second focus control for controlling the focus lens so as to move it to a focus position by a contrast AF method; and a flicker detection unit which detects a flicker, wherein the focus control unit decides which of the first focus control and the second focus control should be performed selectively at least according to whether the flicker detection unit has detected a flicker.

In the disclosed imaging apparatus, the focus control unit selects the first focus control in a state that the flicker detection unit has detected a flicker.

In the disclosed imaging apparatus, the imaging device includes plural first phase difference pixels that receive one of a pair of light beams that pass through different portions of a pupil region of the imaging optical system and plural second phase difference detection pixels that receive the other of the pair of light beams; in a state that the flicker detection unit has detected a flicker, the focus control unit selects the first focus control if an exposure time of the imaging device that is necessary for the first focus control is shorter than or equal to a threshold value and selects the second focus control if the exposure time is longer than the threshold value; and where the focus control unit selects the second focus control method in the state that the flicker detection unit has detected a flicker, the focus control unit sets an exposure time of the imaging device of each of plural times of shooting necessary for the second focus control at a natural number multiple of a cycle of the flicker detected by the flicker detection unit.

In the disclosed imaging apparatus, the focus control unit selects the first focus control until establishment of a state that the flicker detection unit can detect a flicker.

The disclosed imaging apparatus further comprises a focus control method setting unit which sets one of the first focus control and the second focus control as a focus control to be performed preferentially, according to a manipulation on a manipulation unit, wherein the focus control unit selects the control method that is set by the focus control method setting unit in a state that the flicker detection unit has not detected a flicker.

The disclosed focus control method is a focus control method in an imaging apparatus having an imaging device that shoots a subject via an imaging optical system including a focus lens, comprising a focus control step of selectively performing one of a first focus control for controlling the focus lens so as to move it to a focus position by a phase difference AF method and a second focus control for controlling the focus lens so as to move it to a focus position by a contrast AF method; and a flicker detecting step of detecting a flicker, wherein the focus control step decides which of the first focus control and the second focus control should be performed selectively at least according to whether the flicker detection unit has detected a flicker.

INDUSTRIAL APPLICABILITY

The invention is useful when applied to imaging apparatus such as electronic apparatus having a shooting function (e.g., smartphones) and digital cameras.

Although the invention has been described above using the particular embodiments, the invention is not limited to the embodiments and various changes are possible without departing from the technical concept of the disclosed invention.

The present application is based on Japanese Patent Application No. 2012-256351 filed on Nov. 22, 2012, the disclosure of which is incorporated herein by reference.

DESCRIPTION OF SYMBOLS

100: Lens device
200: Camera body
1: Shooting lens
5: Solid-state imaging device
11: System control unit
12: Flicker detection unit
18: Contrast AF processing unit
19: Phase difference AF processing unit
51: Imaging Pixel
51R, 51L: Phase difference detection pixels

The invention claimed is:
1. An imaging apparatus, comprising:
an imaging device that shoots a subject via an imaging optical system, the imaging optical system including a focus lens; and at least one central processing unit (CPU) configured to selectively perform one of a first focus control for controlling the focus lens so as to move the focus lens to a focus position by a phase difference AF method and a second focus control for controlling the focus lens so as to move the focus lens to a focus position by a contrast AF method; and detect a flicker, wherein the at least one central processing unit decides which of the first focus control and the second focus control should be performed selectively at least according to whether a flicker has been detected, the imaging device comprises plural first phase difference pixels that receive one of a pair of light beams that pass through different portions of a pupil region of the imaging optical system and plural second phase difference detection pixels that receive other of the pair of light beams, in a state that a flicker has been detected, the at least one central processing unit selects the first focus control if an exposure time of the imaging device that is necessary for the first focus control is shorter than or equal to a threshold value and selects the second focus control if the exposure time is longer than the threshold value, and where the at least one central processing unit selects the second focus control method in the state that a flicker has been detected, the at least one central processing unit sets an exposure time of the imaging device of each of plural times of shooting necessary for the second focus control at a natural number multiple of a cycle of the detected flicker.

2. The imaging apparatus according to claim 1, wherein the at least one central processing unit selects the first focus control until establishment of a state that a flicker can be detected.

* * * * *